Sept. 19, 1950     P. L. SCHNEIDER ET AL     2,523,151

STARTING MOTOR DRIVE

Filed May 8, 1948     2 Sheets-Sheet 1

INVENTORS
Paul L. Schneider and
BY Harold J. Cromwell
Spencer Hardman & Fehr
their attorneys

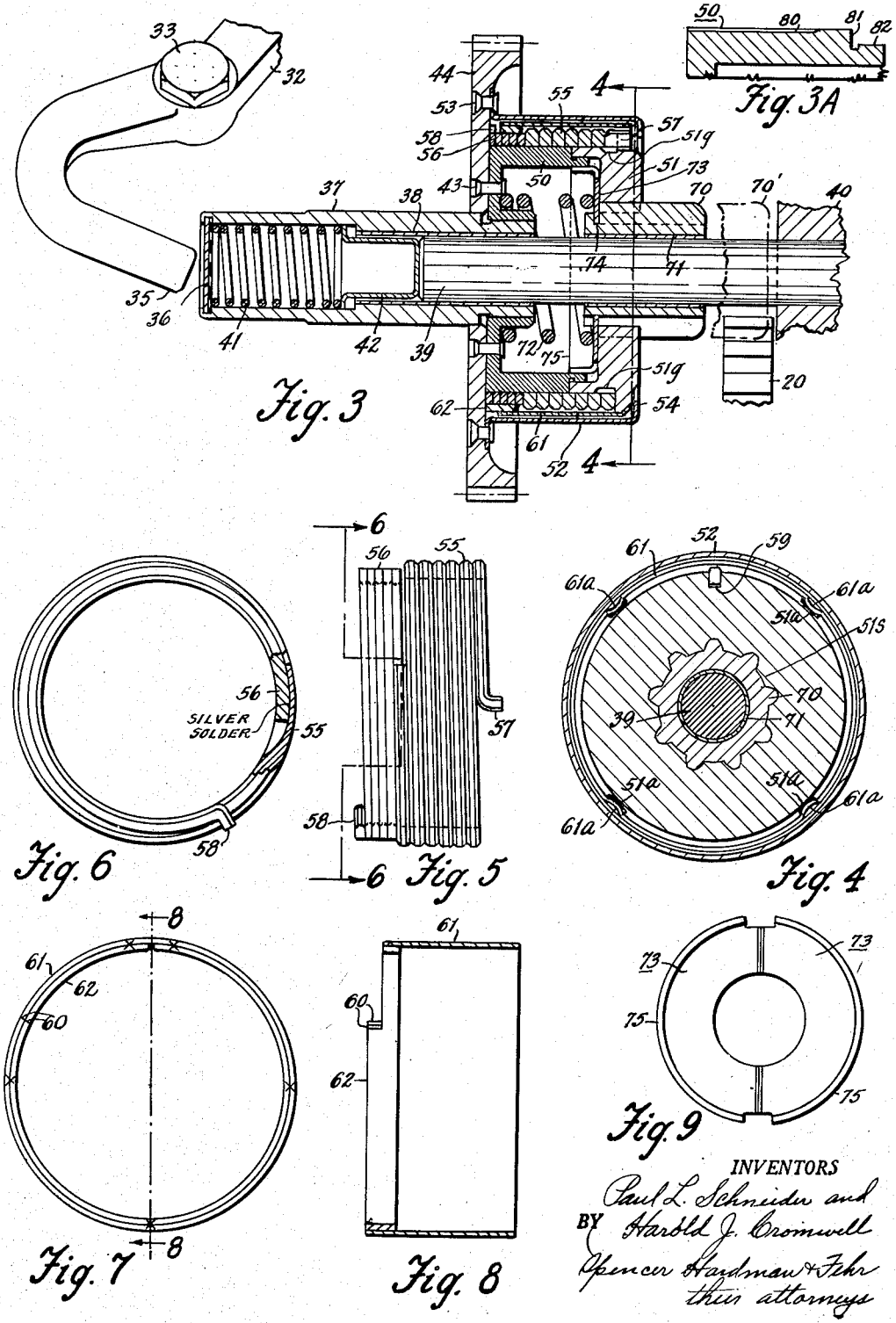

Patented Sept. 19, 1950

2,523,151

UNITED STATES PATENT OFFICE 2,523,151

STARTING MOTOR DRIVE

Paul L. Schneider and Harold J. Cromwell, Anderson, Ind., assignors to General Motors Corporation, Detroit, Mich., a corporation of Delaware Application May 8, 1948, Serial No. 25,854

2 Claims. (Cl. 74—6)

This invention relates to engine starting apparatus of the type which comprises an electric motor, a pinion movable axially into mesh with a gear of the engine to be started and a one-way or overrunning clutch for connecting the motor with the pinion.

An object of the invention is to provide a starter having means for preventing damage to the starter in case of back-fire. To accomplish this object, the one-way clutch, which transmits engine cranking torque to the engine and which overruns when the engine becomes self-operative, has torque limiting provisions. In case of back-fire of the engine causing reversal of the engine, the clutch is automatically disengaged and transmission of torque to the starting motor is prevented. The present starter includes a spring clutch for connecting the motor shaft with the pinion and having a driving cylinder connected with the motor shaft through suitable gearing and a driven cylinder connected with the pinion and a helical main clutch spring surrounding the cylinders and having one end connected with the driven cylinder, said driven cylinder having an annular groove adapted to receive that portion of the main spring adjacent to the end thereof connected with the driven cylinder, and a helical auxiliary or teaser spring engaging the driving cylinder and having one end attached to the other end of the main clutch spring, means for moving the pinion axially into mesh with the engine gear and for effecting operation of the motor whereby, in response to a rotary movement of the driving cylinder relative to driven cylinder, the teaser spring causes the main spring to wrap itself about the clutch cylinders to transmit cranking torque from the motor to the pinion, and a member connected with the driven cylinder and having an abutment engageable with the free end of the teaser spring when, in case of engine back-fire, the torque transmitted begins to exceed a predetermined value and the main spring wraps into the annular groove of the normally driven cylinder whereby the teaser spring is caused to unwrap itself and causes the main spring to relinquish its grip on the clutch cylinders and the clutch is disengaged.

Further objects and advantages of the present invention will be apparent from the following description, reference being had to the accompanying drawings, wherein a preferred embodiment of the present invention is clearly shown.

In the drawings:

Fig. 3 shows a longitudinal, sectional view of the clutch.

Fig. 3A is an enlarged fragmentary, longitudinal sectional view of cylinder 50 showing its grooves 80.

Fig. 4 is a sectional view on line 4—4 of Fig. 3.

Fig. 5 is a side view of the assembly of the clutch springs.

Fig. 6 is a view on line 6—6 of Fig. 5.

Fig. 7 is an end view of a sleeve 61 and band 62.

Fig. 8 is a sectional view on line 8—8 of Fig. 7.

Fig. 9 shows the sides of the two C-washers 73 in assembled relation.

Figure 1:
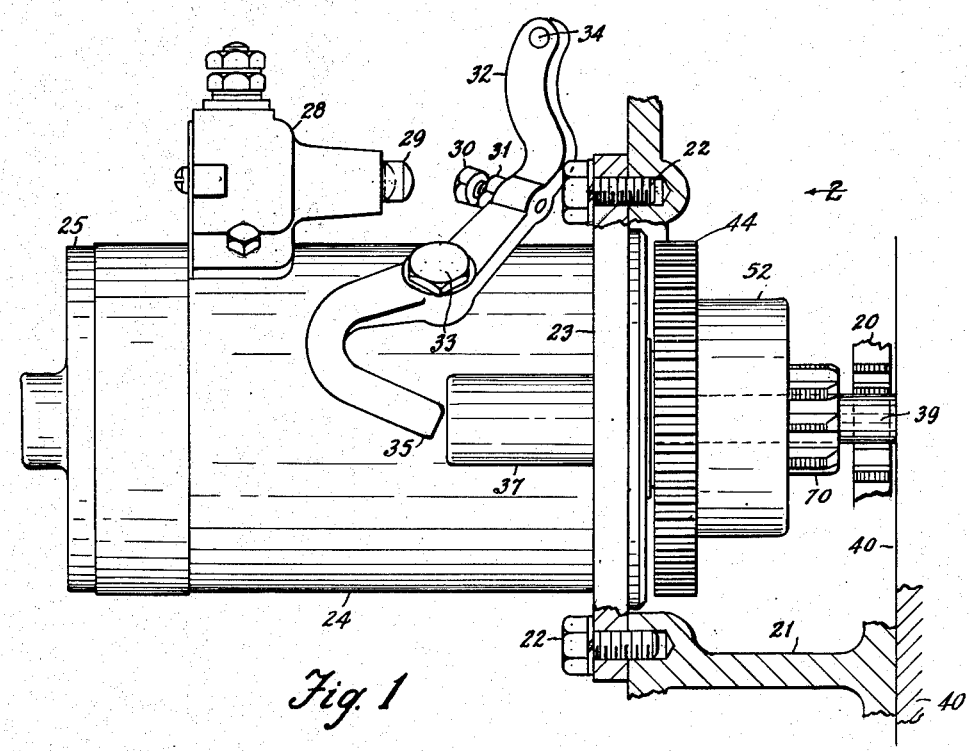
Fig. 1 shows a side view of the engine starting apparatus.
Figure 2:
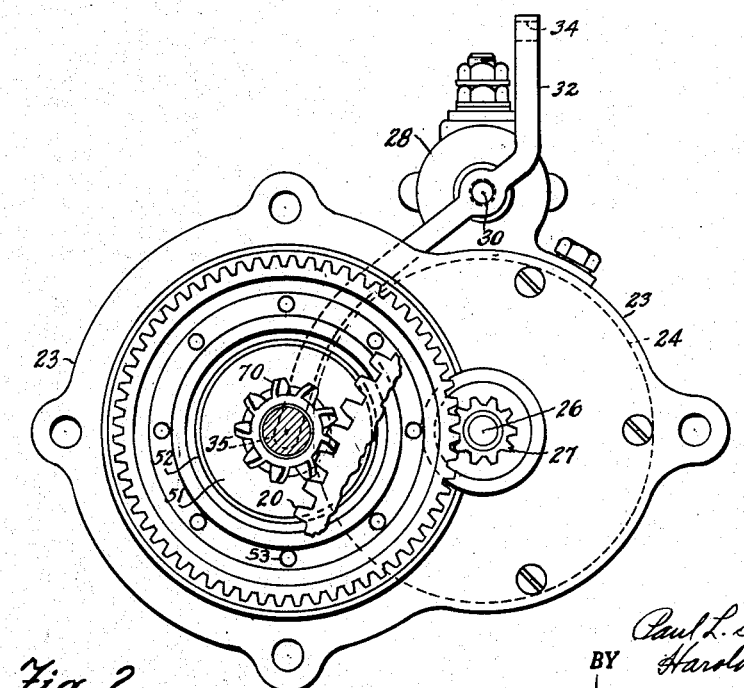
Fig. 2 shows a view in the direction of arrow 2 of Fig. 1.

Referring to Figs. 1 and 2, the gear 20 of the engine to be started is enclosed by a housing 21 to which screws 22 attach the right end frame 23 of an electric motor whose field frame 24 and left end frame 25 are supported by frame 23. The frames 23 and 25 provide bearings supporting the armature shaft 26 of the motor which drives a small gear 27. The frame 24 supports a motor control switch 28 having an actuator 29 located in the path of movement of a screw 30 threaded into a lever 32 and locked in the desired position of adjustment by a nut 31. Lever 32 is pivoted on a screw stud 33 threaded into the frame 24 and has a hole 34 for receiving a pin by which a lever operating pedal can be attached. Lever 34 has an end portion 35 for engaging a disc 36 (Fig. 3) attached to a sleeve 37 provided with a bearing 38 received by a rod 39 fixed to an engine frame portion 40 to which gear housing 21 is attached. The sleeve 37 is normally maintained in the position shown in Figs. 1 and 3 by a spring 41 confined between the disc 36 and a thimble 42 engaging the rod 39.

The sleeve 37 is attached to a clutch driving cylinder 50 attached by rivets 43 to a gear 44 meshing with gear 27 which has a width sufficient to maintain driving engagement with gear 44 in all axial positions thereof in the starter assembly. A driven clutch cylinder 51 having outside diameter equal to that of the cylinder 50 is maintained in assembly therewith by a tubular housing 52 attached to gear 44 by rivets 53 and having an internal annular flange 54 which limits axial separation of the cylinders. Satisfactory clutch operation is effected if the cylinder 50 is provided with a plurality of longitudinal grooves 80 (Fig. 3A) which are ¹⁄₃₂" wide and .020" deep before the cylinder is ground to reduce its diameter about .015". After grinding the cylinder 50, the grooves would be about .0125" deep. The grooves are equally spaced on centers about ⅛ inch apart. The groove cutter should run out about 1/16" from shoulder 81. The surface 82 of the cylinder 50 serves as a pilot for the cylinder 51.

The cylinders are surrounded by a main clutch spring 55 and an auxiliary or teaser spring 56 united as shown in Figs. 5 and 6, by any suitable means not interferring with spring temper, for example, by silver solder. The internal surface of the spring 54 is slightly larger in diameter than the cylinders. The internal surface of spring 56 is smaller in diameter than the cylinder 50. Therefore, when assembling the springs in the cylinders, the spring 56 is unwound; and it normally grips the cylinder 50 with appreciable pressure. The free end of spring 55 has a hook 57 received by a notch 59 in the cylinder 51. The free end of spring 56 has a hook 58 adapted to engage an abutment 60 provided by a sleeve 61 and a band 62 attached thereto by welding at x (Fig. 7) for a purpose to be described. When engine cranking torque is applied to the cylinder 50, the spring 56 is dragged by the cylinder 50 in the direction to wind it more tightly around the cylinder and to cause the main spring 55 to grip the cylinders and transmit the torque.

Cylinder 51 has internal splines 51s engaging the teeth of a pinion 70 provided with a bearing bushing 71 and slidable on the rod 39 into mesh with the gear 20. Axial movement is transmitted from the clutch to the pinion by a compressed spring 72 confined between the cylinder 50 and two C-washers 73 which are received by an annular groove 74 in pinion 70 and which have flanges 75 received within the cylinder 50, thereby retaining the C-washers which the spring 72 urges against the cylinder 51 and the latter against the flange 54 of housing 52.

In order that, in case of back-fire, the clutch will not transmit torque in excess of a certain value, the proper location of abutment 60 is determined before the clutch is assembled with other parts. A certain torque is applied to cylinder 50 while cylinder 51 is fixed. The sleeve 61 is adjusted rotatively so that there is only a certain slight clearance between spring hook 58 (Fig. 6) and abutment 60 (Fig. 8). While holding the sleeve 61 stationary, torque slightly exceeding the certain value is applied to the cylinder 50. If the sleeve 61 is in the proper position of angular adjustment, when the clutch attempts to transmit this additional torque, a portion of the spring 55 adjacent the hook 57 will be wound into the annular groove defined by the portion 51g of reduced diameter of cylinder 51 thereby causing the hook 58 of spring 56 to engage the abutment 60 which applies to the hook 58 a reaction force which unwinds the spring 56 thereby unwinding the spring 55 so that the clutch will slip. If the torque is reduced to said certain value, the clutch should not slip if the sleeve 61 is in the proper position angularly relative to the cylinder 51. Then the sleeve 61 which carries the abutment 60 is attached to the cylinder 51 by staking the sleeve at 61a into notches 51a provided by the cylinder 51. After the sleeve 61 has been staked to the cylinder 51, the clutch is assembled with other parts as shown.

To start the engine, the operator moves the lever 32 counterclockwise to cause it to move the clutch assembly to the right to move the pinion 70 into position 70' into mesh with the engine gear 20 and to close the starter switch 28 whereupon the motor cranks the engine through torque transmitted by gears 27, 44, the spring clutch and pinion 70 and gear 20. If the teeth of pinion 70 should abut the teeth of gear 20, the lever 32 can be moved to close the starter switch while moving the clutch assembly further to compress the spring 72 which, when the motor rotates the pinion 70 into meshing registration with the gear, is released to move the pinion quickly into mesh with the gear. When the engine becomes self-operative and drives the pinion 70 faster than it can be driven by the electric motor, the clutch cylinder 51 overruns the cylinder 50 because the springs 55, 56 are being dragged around in a direction tending to unwind them.

If the engine should back-fire, thereby causing application of torque of excessive value through the clutch, a portion of spring 55, adjacent the hook 57, is deflected toward the surface 51g of cylinder 51, thereby causing angular displacement of hook 57 and sleeve 61 relative to hook 58. The abutment 60 of sleeve 61 engages and moves the spring hook 58 in the direction to cause the spring 56 to unwind itself and also to unwind the spring 55, thereby disengaging the clutch and preventing damage to the starter. The one-way clutch with torque limiting provisions is particularly useful in an engine starter which provides a high gear ratio drive between the starting motor and the engine shaft, for example, 35 to 1. During cranking, the motor armature attains considerable momentum. If the overload torque release of the clutch were not provided, when the engine back-fires, the starting apparatus would be damaged because the engine would suddenly be attempting to drive the motor shaft in the opposite direction at thirty-five times engine shaft speed.

While the embodiment of the present invention as herein disclosed, constitutes a preferred form, it is to be understood that other forms might be adopted, all coming within the scope of the claims which follow.

What is claimed is as follows:

1. A clutch-pinion assembly for connecting an electric motor with a gear connected with an engine to be started and adapted to be moved axially by a control device which effects operation of the motor, said assembly comprising a pinion for meshing with the engine gear when the assembly is moved axially toward it, a spring clutch having a driving cylinder connected with the motor and a driven cylinder connected with the pinion and a helical main clutch spring surrounding the cylinders and having one end connected with the driven cylinder, said driven cylinder having an annular groove adapted to receive that portion of the main spring adjacent to the end thereof connected with the driven cylinder, and a helical auxiliary or teaser spring engaging the driving cylinder and having one end attached to the other end of the main clutch spring, the teaser spring operating during operation of the motor after the pinion has been meshed with the engine gear to cause the main spring to wrap itself about the clutch cylinders to transmit cranking torque from the motor to the pinion, and a member connected with the driven cylinder and having an abutment engageable with the free end of the teaser spring when, in case of engine back-fire, the torque transmitted begins to exceed a predetermined value and the main spring wraps into the annular groove of the normally driven cylinder whereby the teaser spring is caused by the abutment to unwrap itself and thereby causes the main spring to relinquish its grip on the clutch cylinders and the clutch is disengaged.

2. A clutch-pinion assembly according to claim 1 in which the driven shell is provided with internal splines engaging the teeth of the pinion and in which a spring within the clutch cylinders transmits axial movement from the clutch to the pinion, said spring yielding in case of tooth abutment to permit movement of the motor control device to effect operation of the motor to cause the pinion to move into meshing registration with the engine gear.

PAUL L. SCHNEIDER.
HAROLD J. CROMWELL.

REFERENCES CITED

The following references are of record in the file of this patent:

UNITED STATES PATENTS

| Number | Name | Date |
| --- | --- | --- |
| 1,729,761 | Chryst | Oct. 1, 1929 |
| 1,747,146 | Tappan et al. | Feb. 11, 1930 |
| 1,953,370 | Starkey | Apr. 3, 1934 |